(12) United States Patent
Goman et al.

(10) Patent No.: US 6,196,459 B1
(45) Date of Patent: Mar. 6, 2001

(54) SMART CARD PERSONALIZATION IN A MULTISTATION ENVIRONMENT

(75) Inventors: Robert Neal Goman, Minneapolis; Denis C. Burand, Excelsior; Thomas L. Younger, Wayzata; Robert S. Ehrlich, Mendota Heights, all of MN (US)

(73) Assignee: UBIQ Incorporated, Minnetonka, MN (US)

( * ) Notice: Subject to any disclaimer, the term of this patent is extended or adjusted under 35 U.S.C. 154(b) by 0 days.

(21) Appl. No.: 09/076,022

(22) Filed: May 11, 1998

(51) Int. Cl.[7] ...................................................... G06K 5/00
(52) U.S. Cl. ............................................ 235/380; 235/492
(58) Field of Search .................................... 235/380, 492; 706/10

(56) References Cited

U.S. PATENT DOCUMENTS

| | | | |
|---|---|---|---|
| 4,772,782 | 9/1988 | Nonat | 235/380 |
| 4,825,054 | 4/1989 | Rust et al. | 235/380 |
| 4,827,425 | 5/1989 | Linden | 364/478 |
| 4,874,935 | 10/1989 | Younger | 235/492 |
| 5,025,399 | 6/1991 | Wendt et al. | 364/519 |
| 5,266,781 | 11/1993 | Warwick et al. | 235/375 |
| 5,534,857 | 7/1996 | Laing et al. | 340/825.34 |
| 5,684,742 | 11/1997 | Bublitz et al. | 365/189.01 |
| 5,799,316 | 8/1998 | Audren | 707/104 |
| 5,889,941 | * 3/1999 | Tushie et al. | 235/380 X |

FOREIGN PATENT DOCUMENTS

| | | | |
|---|---|---|---|
| 706150A1 | 9/1995 | (EP) | G06K/17/00 |
| 95/22810 | 2/1994 | (WO) | G07F/7/12 |
| 97/39424 | 4/1996 | (WO) | G06K/19/06 |
| 98/18106 | 10/1996 | (WO) | G07C/9/00 |
| 98/09257 | 8/1997 | (WO) | G07F/7/10 |

OTHER PUBLICATIONS

Audren, J., English abstract for EP706150 published Sep. 25, 1995 (Derwent Info Ltd., Oct. 15, 1999); 2 pgs.

Moraine, M., English abstract for WO 98/18106 published Oct. 16, 1997 (Derwent Info Ltd., Oct. 15, 1999); 2 pgs.

* cited by examiner

*Primary Examiner*—Karl D. Frech
(74) *Attorney, Agent, or Firm*—Schwegman, Lundberg, Woessner & Kluth, P.A.

(57) ABSTRACT

A smart card personalization system provides an interface to smart card personalization stations and to external computing or data resources which normally are not available directly to personalization station. A card issuer management systems prepares card objects and assigns a unique card object identifier. A smart card personalization server receives the card objects from the card issuer management system. A smart card personalization controller receives the unique card object identifiers and routes the card object identifiers to waiting personalization stations. The personalization stations use the card object identifier to request data and services from the smart card personalization server in order to personalize the smart card. The services provided by the smart card personalization server include data services, security services and support services. The smart card personalization server supports multiple active personalization station sessions.

23 Claims, 4 Drawing Sheets

SMART CARD PERSONALIZATION IN A MULTISTATION ENVIRONMENT

FIELD OF THE INVENTION

The present invention relates generally to data storage devices an more specifically to the control of smart card personalization in a multistation environment.

BACKGROUND OF THE INVENTION

Increasing numbers of organizations which issue transaction cards to their users, customers, or employees require cards tailored to meet the requirements of their particular service or application. These organizations also want the cards to contain data about the cardholder. Existing transaction cards encode such data in a magnetic stripe on the back of the card but the amount of data that can be held by a magnetic stripe is limited. A new type of transaction card embeds a microprocessor computer chip in the plastic of the card to greatly increase the card's data storage capacity. Additionally, sophisticated card applications specific to the card issuer can execute in certain varieties of the chips, and the chip may also contain a type of operating system. Transaction cards with embedded chips are referred to in the industry as portable programmed data carriers, more commonly called "smart cards." The chip in a smart card is generally programmed with initialization and/or personalization data at the same time as the surface of the card is being embossed and/or printed.

The initialization data comprises three major types of information: application data, security data, and printed data. The application data is common to all cards for a given card application and includes application program code and variables. The security data prevents fraudulent use of the card and is usually provided in the form of "secure keys." Printed data, such as a logo, bar codes, and various types of numerical information, are placed on the surface of the card. Some or all of the same data can also be embossed on the surface. Optical technology also can be employed to make part or all of the surface of the card into a storage medium with data accessible by an appropriate optical reader.

Smart cards are also programmed with information specific to an individual cardholder through a process called "personalization." The personalization information for a smart card is similar to the personalization information currently contained on non-smart cards, such as the cardholder's name, account number, card expiration date, and a photograph. Because of its increased storage capacity, the chip in a smart card can contain additional data beyond the basic information on the standard transaction card including a graphical representation of the individual's signature, data defining the types of service the cardholder is entitled to, and account limits for those services.

Current systems from performing smart card initialization and/or personalization include a controller or a personal computer which is connected to a personalization station. All of the smart card programming data required for the personalization process is sent from the controller or personal computer to the personalization station which programs the smart card. An application running on the personalization station controls the programming of the smart card. Many current personalization stations have a limited capacity to handle the increasingly sophisticated personalization process as the size and functionality of smart card computer chips increase. Such limitations include the memory, processing capacity, and buffer size of the personalization stations.

In addition, personalization stations may require access to external resources which provide security services or access to card data. The external resources, particularly the security services, are expensive infrastructures to repeat for each personalization station. Also, communication between the personalization station and the external resource is limited by the speed of the communication link between them. In addition, the application development environment available on the personalization stations is often unique and lacking in development tools.

Therefore, there is a need for a personalization system which overcomes the limitations on memory capacity and processing flexibility of current personalization stations. There is also a need for a personalization system which can share external resources between multiple personalization stations.

SUMMARY OF THE INVENTION

The above-identified shortcomings as well as other shortcomings are addressed by the present invention, which will be understood by reading and studying the following specification. The invention is a computerized system for controlling programming of portable programmed data carriers across a plurality of personalization stations. The system includes a personalization server interface for acquiring services from one or more resources, transferring card information to one of the personalization stations and controlling the programming of the portable programmed data carrier. The system also includes a personalization station interface for receiving the card information from the personalization server interface and for programming the portable programmed data carrier.

The invention also described is a method of controlling programming of portable programmed data carriers in a system having a plurality of personalization stations. The method includes receiving one or more card objects from a card issuer management system. The card objects consist of information for programming the portable programmed data carriers. The method also includes receiving a programming request from the personalization station and utilizing the card object to control the personalization station as the personalization station programs the portable programmed data carrier.

Alternatively, the invention described is a computerized system which includes a means for receiving one or more card objects from a card issuer management system. The computerized system also includes a means for receiving a programming request from the programming station and a means for utilizing the card object to control the personalization station as the personalization station programs the portable programmed data carrier.

The smart card personalization system uses a data structure comprising a data field representing a card object containing information for programming a portable programmed data carrier and an additional data field containing a unique card object identifier for identifying the card object.

Therefore, the smart card personalization system of the present invention shares external resources between multiple personalization stations. Other aspects and advantages of the invention will become apparent by reference to the drawings and by reading the following detailed description.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digit(s) of reference numbers appearing in the Figures usually corresponds to the Figure number, with the exception that identical components which appear in multiple figures are identified by the same reference numbers.

The system of the present invention utilizes a personalization server to control smart card personalization in an environment having a plurality of personalization stations. The personalization server provides an interface to a plurality of card personalization stations and to external computing or data resources which normally are not directly available to the card personalization stations or which are not cost efficient to replicate at each card personalization station.

The detailed description of this invention is divided into four sections. The first section provides an overview of one embodiment of a system for issuing smart cards which incorporates a smart card personalization server of the present invention. The second section describes the functional specifications for the software components of the example embodiment of the smart card personalization system. The third section illustrates an example communication sequence between personalization station interface software and personalization server software for a smart card personalization process. The fourth section is a conclusion which includes a summary of the advantages of the present invention.

Smart Card Personalization System Overview.

Figure 1:
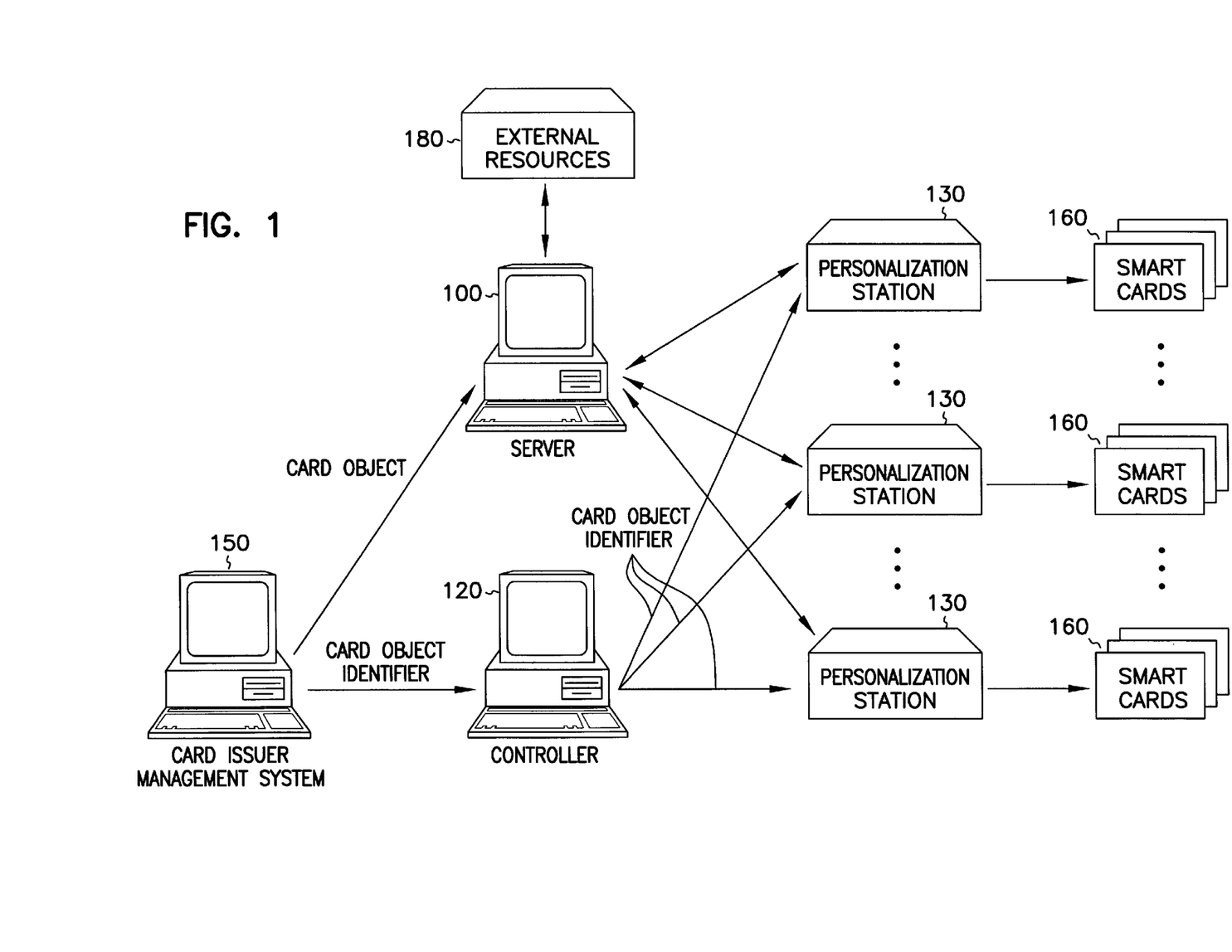
FIG. 1 is a block diagram representing an embodiment of a smart card issuing process that incorporates a smart card personalization server of the present invention.

FIG. 1 illustrates components of a smart card issuing process that incorporates one embodiment of the smart card personalization server of the present invention. The smart card personalization server 100 receives card objects from a card issuer management system 150. A smart card personalization controller 120 receives, from the card issuer management system 150, a card object identifier for each one of the card objects passed to the smart card personalization server 100. The smart card personalization controller 120 routes each one of the card object identifiers to one of a plurality of personalization stations 130. Each personalization station 130 uses the card object identifier to request data and services from the smart card personalization server 100 in order to personalize a smart card 160.

The card issuer management system 150 manages the cardholder data and determines the type of card to issue, the card applications to embed in the card, and what personalization equipment to use to issue the card for a particular cardholder.

The smart card personalization server 100 is illustrated in FIG. 1 as a computer executing personalization server software as further described below. The personalization server software executes under an operating system such as Unix, Windows 95©, or Windows NT©, and on industry-standard workstation and/or personal computer hardware. As described below, the smart card personalization server 100 provides an interface to card personalization stations 130 and to external computing or data resources 180.

The server 100 controls card printers, embossing devices, and integrated or add-on smart card interface devices collectively represented in FIG. 1 as a plurality of personalization stations 130. Personalization stations 130 also represent such devices as large volume card printer/embossers, small volume card printer/embossers, automatic teller machines (ATMs), point of sale terminals, unattended kiosks, personal computers, network computers, and on-line telecommunication devices. The physical connection between the devices and the smart card personalization server 100 varies according to the manufacturer and model of the device. Common industry standard connections include serial RS232, SCSI (Small Computer System Interface), Ethernet, and serial TTL (Transistor-Transistor Logic). In addition, some devices require a proprietary bus connection.

The connections between the smart card personalization server 100 and the card management system 150 and the stations 130 can also be implemented through standard local area networks, wide area networks, dedicated phone lines, or other remote communication infrastructure used to transfer data. Alternate connections will be apparent to those skilled in the art and are within the scope of the invention.

Figure 2:
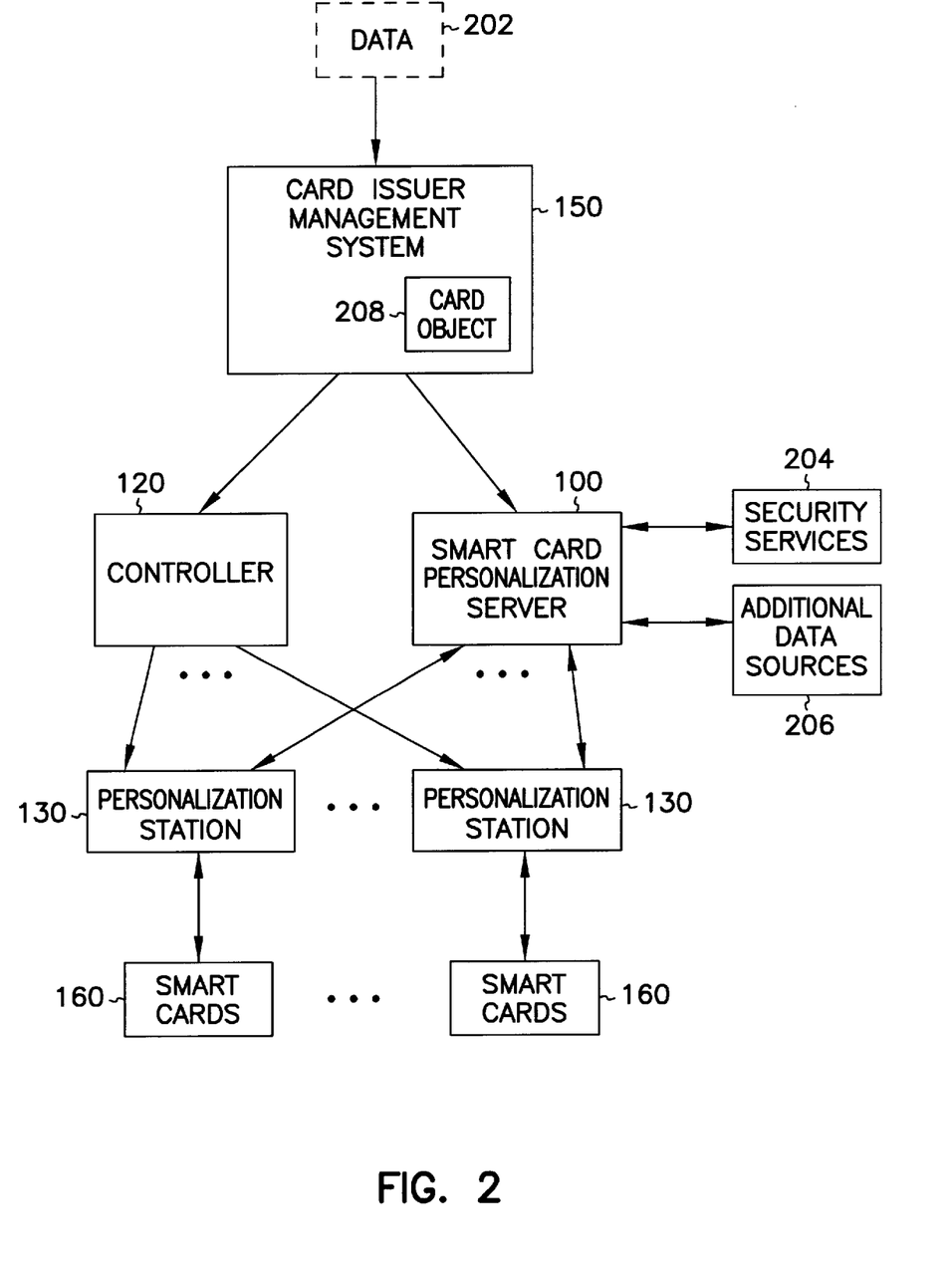
FIG. 2 is a functional block diagram of input and output connections for the embodiment of the smart personalization server of shown in FIG. 1.

FIG. 2 is a block diagram of one embodiment of the smart card personalization system illustrating the logical input and output connections for the smart card personalization server 100. The cardholder data 202 input and maintained by the card issuing organization contains information about each individual cardholder, such as name, account number, card expiration date, and applicable services. The card issuer management system 150 assembles the data necessary for each card personalization job. The data for each job can be stored in a card object data store, such as a database, with each card object 208 accessible by a unique card object identifier. A job can be, for example, a logical grouping of similar card objects.

The card objects 208 contain, for example but not with limitation, data and commands for magnetic stripe encoding, embossing, printing, packaging and smart card personalization. An example card object is shown below.

Card Object

EMB="123456789", "Your Name", "1/1/1999"

ENC=%B123456789^Y/Name^01011999?;123456789=01011999?

PIC=www.photos.com/YourName

SCRD=this_unique_card object_identifier

The example card object begins with an emboss instruction "EMB" followed by the corresponding cardholder data to be embossed on the card. The second line in the example card object shown above is an encode instruction "ENC" followed by the corresponding cardholder data to be encoded on the magnetic strip of the card. The third line in the example card object is an instruction to print a picture on the card "PIC" followed by the location of the cardholder's picture. The fourth line in the example card object is a smart card portion of the card object "SCRD". The smart card portion of the card object 208 consists of the unique card object identifier.

The card issuer management system 150 passes the card object 208 to the smart card personalization server 100. The smart card personalization server 100 expects the personalization data to be in a particular format. Because the card object 208 is in a format defined by the card issuer that often differs from the format(s) expected by the server 100, the card object 208 is translated by the server 100 when necessary. One method of translating the card object is described in U.S. patent application Ser. No. 08/755,459 entitled "System and Apparatus for Smart Card Personalization", filed on Nov. 22, 1996.

The smart card personalization server 100 provides an interface to external security services 204 and additional data sources 206 as needed to perform a smart card personalization job. The software program for the smart card personalization server 100 can be coupled to the data sources 206 through standard data query commands that provide access to the data stored in the data sources. The communication protocols between the software program for the smart card personalization server 100 and the external security services 204 and the data sources 206 vary depending upon the underlying data management system or security system employed.

The smart card personalization server 100 also provides an interface to each one of a plurality of card personalization stations 130. The smart card personalization controller 120 passes a card object identifier to one of the waiting personalization stations 130. The personalization station 130 presents the card object identifier to the server 100 in order to initiate access to the data services, security services or support services needed to complete the smart card personalization. Upon receiving the card object identifier from the personalization station 130, the smart card personalization server 100 translates the card object indicated by the card object identifier. The translation of the card object by the smart card personalization server 100 results in a sequence of commands and/or data which are passed to the personalization station 130. The personalization station 130 passes the commands and data received from the server 100 directly to the smart card 160. An example process demonstrating how the server 100 controls the actual card programming is described below.

Personalization Software Specifications.

Figure 3:
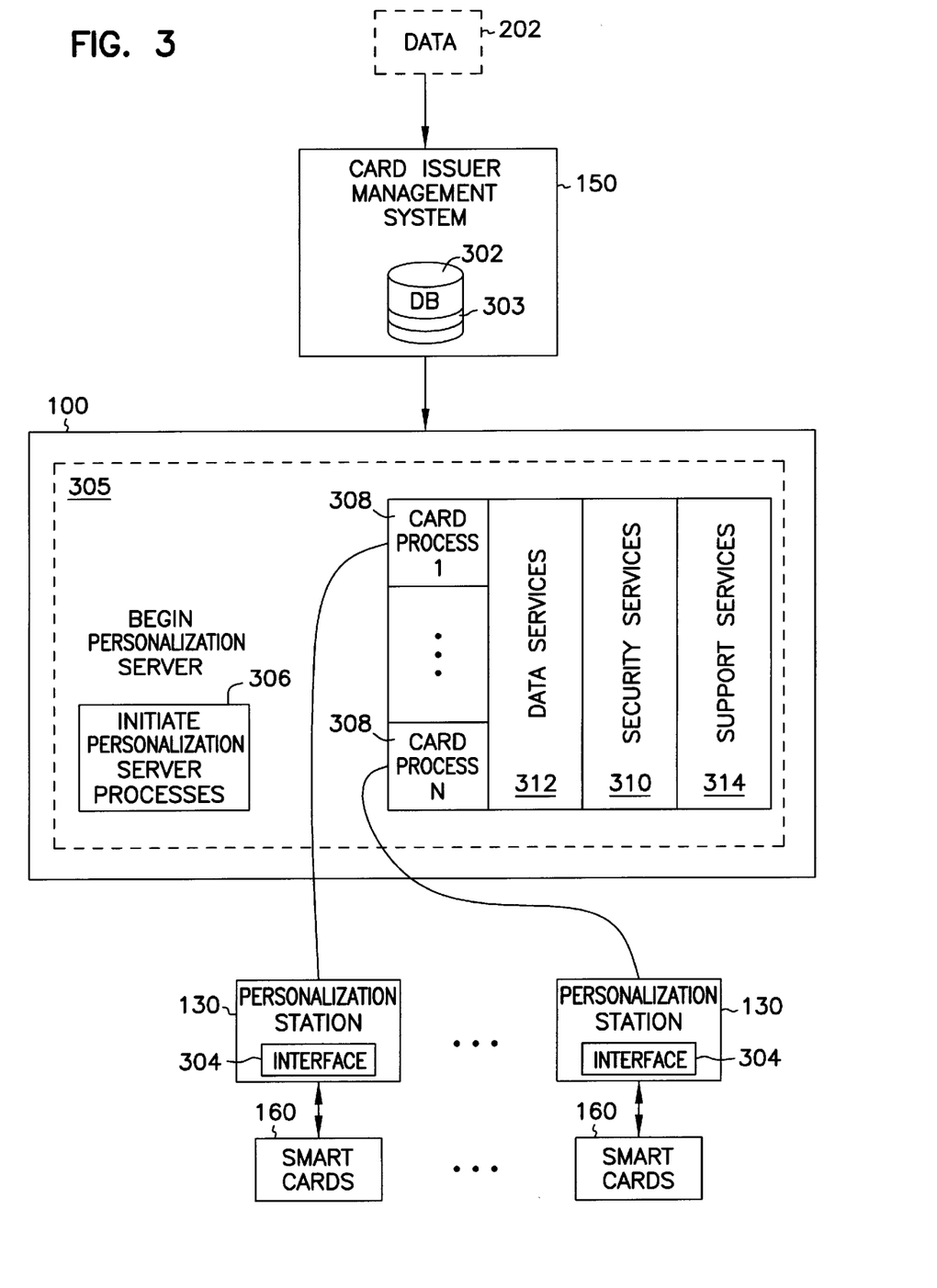
FIG. 3 is a block diagram showing one embodiment of the smart card personalization software of the present invention.

FIG. 3 is a block diagram showing one embodiment of the smart card personalization server 100 of FIG. 2. The system of the present invention utilizes the personalization server 100 to control smart card personalization in an environment having a plurality of personalization stations 130 coupled to the personalization server 100. The personalization server 100 provides an interface to card personalization stations 130 and to external computing or data resources 204, 206 as shown in FIG. 2.

An application executing on a card issuer management system 150 prepares a card object 303 and assigns a card object identifier to each object. Information regarding the card objects is archived in a card object database 302 until called upon by the personalization server 100 to personalize a smart card.

The personalization environment of the present invention comprises two complimentary software components. The first is personalization station interface software 304 which executes in a processor of the personalization station 130. The second is personalization server software 305 executing in a processor in the personalization server 100 which processes the personalization card objects and utilizes both local and external resources.

A initialization process 306 initiates a personalization job by initiating the personalization server 100 and optionally sending data, such as embossing or magnetic stripe encoding data, to the personalization station 130. The personalization server software 305 serves multiple card personalization processes 308. Each card personalization process 308 represents a personalization job occurring at one of the personalization stations 130. Each card personalization process 308 is logically linked to one of the personalization stations 130.

The personalization station interface software 304 presents the unique card object identifier to the personalization server software 305 to initiate access to services available through the server software 305. The personalization server software 305 obtains all of the necessary job information as well as the data elements to be used in personalization of the smart card. The personalization station interface software 304 performs the card personalization utilizing the services available to it through the personalization server software 305 as required until personalization is complete. At completion of the job, the personalization station interface software 304 is notified by the server software 305 of completion.

The services provided by the server software 305 include data services 312, security services 310 and support services 314. The data services 312 perform the acquisition of data for each personalization job and include any commonly available means of accessing data. The data services 312 retrieve data archived in the card object data base 302 on the card issuer management system 150 as well as from additional external data sources as shown in FIG. 2. The data can be in the form of files, databases, or data structures for example.

The security services 310 interface with a variety of different external sources which provide security functions. The security functions provided by the external sources include any commonly available means of securing information or limiting access to smart card chips until a required security condition is met. An example security function utilizes one or more "secure keys" that are programmed into the chip to prevent fraudulent use of the card. The appropriate secure key data is obtained by the smart card personalization server software 305 from secure key records maintained by the card issuer or an external security source and then transferred to the personalization station interface software 304. The security services 310 also provide security functions that can be used, for example, to ensure the integrity and secrecy of data during the transmission of data to and from the personalization station 130.

The support services 314 perform processing tasks that in prior systems were performed by the personalization station 130 or were unable to be performed at all due to the limitations of the personalization stations. The support services 314 include any commonly used functions that can be shared between processes such as data conversions and validations for example. An example support service 314 is year 2000 date validation processing. An additional example of a support service 314 is formatting a ten digit string of numbers representing a telephone number so that the area code is in parentheses.

The personalization server software 305 operates on a computer system which includes one or more high speed processors, data communications capability compatible with the target personalization stations, access to external resources such as security or file servers and a multitasking operating system. The smart card personalization processes 308, identified as components of the personalization server software 305, utilize their own virtual memory and share resources as appropriate through threading or other common techniques well known to one skilled in the art.

In summary, the personalization server software moves the processing tasks for initialization and personalization of smart cards from the personalization station to the personalization server. The personalization station interface software is responsible for servicing individual commands from the personalization server software.

Personalization Software Communication Process.

Figure 4:
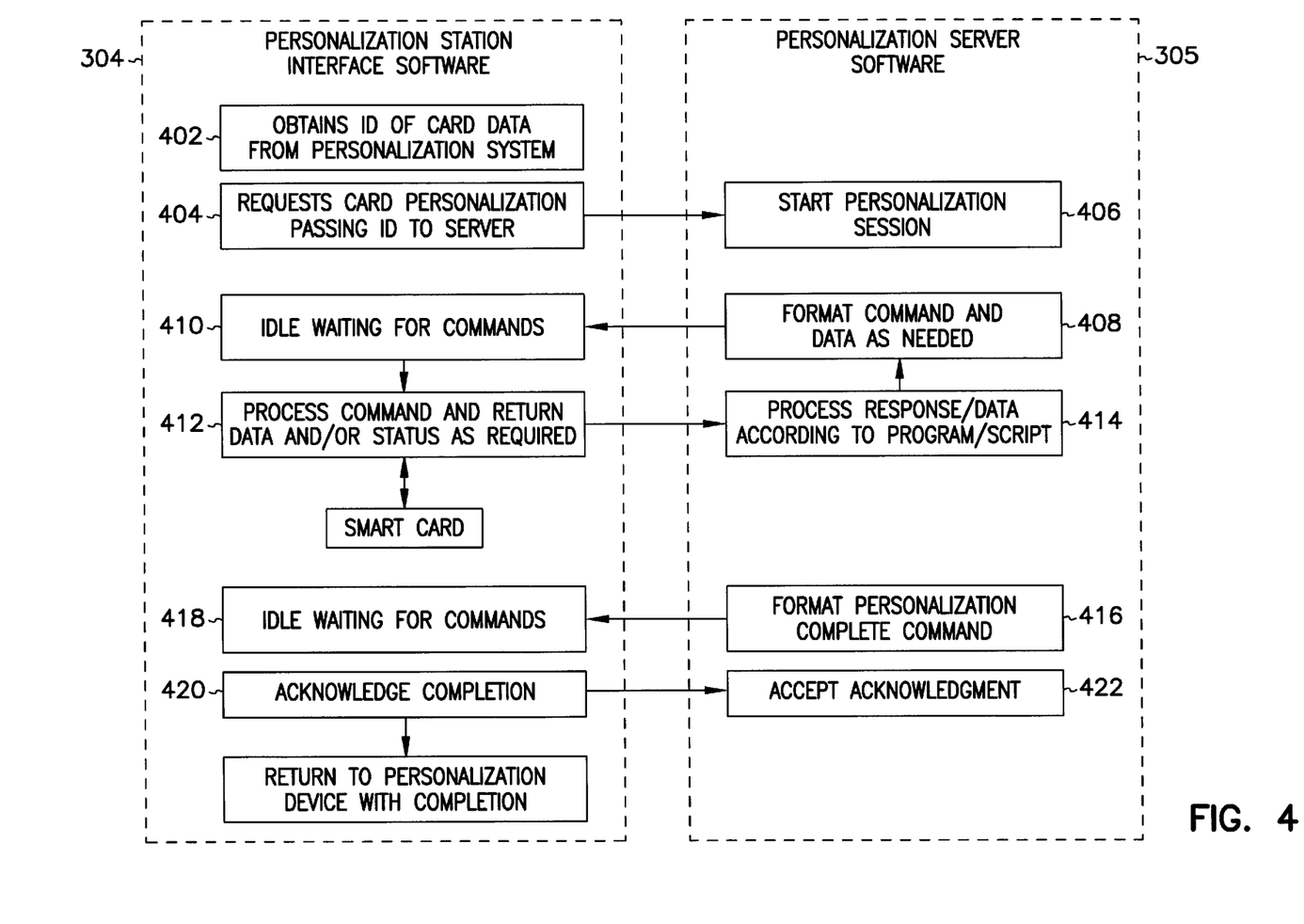
FIG. 4 is a high level flow chart for one embodiment of software which implements the functions of the smart card personalization server.

FIG. 4 illustrates the communication sequence between the personalization station interface software 304 and the personalization server software 305 in order to complete personalization of a smart card. The smart card personalization process begins at stage 402 when the personalization station interface software 304 receives a unique card object identifier from the smart card personalization controller as shown in FIG. 2. At stage 404, the personalization station interface software 304 requests the commands and data necessary to personalize the card by passing the card object identifier to the server software 305. Upon receiving the card object identifier, the server software 305 starts a personalization session with the personalization station interface software 304 at stage 406.

Based on the card object identifier, the server software 305 retrieves and sends the data and commands unique to the card being personalized to the personalization station interface software 304 at stage 408. The data and commands are retrieved locally from the smart card personalization server or from additional external data sources as shown in FIG. 2 including, for example, the card issuer management system 150.

In one embodiment, the personalization station interface software 304 is idle at stage 410 until it receives the commands and data from the personalization server software 305. Upon receiving the commands and data, the personalization station interface software 304 passes the commands and data directly to the smart card and returns data and/or status signals to the server software 305 as an acknowledgement at stage 412. An example of the data returned by the personalization station interface software 304 is a serial number unique to the card and a random number. The data in such case can be used as part of a function provided by a security service such as an authentication algorithm. At stage 414, the server software 305 processes the status signals and/or data returned by the personalization station interface software 304.

For example, at stage 408 the server software 305 sends a "select" command. The personalization station interface software 304 is idle at stage 410 until it receives the "select" command from the server. At stage 412, the personalization station interface software 304 passes the "select" command on to the smart card and returns a status signal as an acknowledgement to the server software 305. After receiving the acknowledgment at stage 414, the server software 305 sends a "write" command and associated data to the personalization station interface software 304 at stage 408. The personalization station interface software 304 is idle at stage 410 until it receives the "write" command from the server software 305. At stage 412, the personalization station passes the "select" command on to the smart card and returns a status signal as an acknowledgement to the server software 305. The loop from stage 408 to stage 410 to stage 412 to stage 414 continues until the personalization is complete.

Upon completion of the personalization of the smart card, the server software 305 sends a "format complete" command to the personalization station interface software 304 at stage 416. The personalization station interface software 304 is idle at stage 418 until it receives the "format complete" command from the server software 305. At stage 420 the personalization station interface software 304 sends an acknowledgement of the "format complete" command to the server software 305 and to the smart card. The personalization process is complete at stage 422 when the server software 305 receives the acknowledgement.

Conclusion.

In summary, the system of the present invention utilizes a personalization server to control smart card personalization in an environment having a plurality of personalization stations. The personalization server provides an interface to a plurality of card personalization stations and to external computing or data resources which normally are not directly available to the card personalization stations or which are not cost efficient to replicate at each card personalization station. The personalization server off-loads the processing of tasks for initialization and personalization of smart cards from the personalization station to the personalization server. The personalization station is responsible for servicing individual commands from the personalization server.

An advantage of the present invention is that the personalization server can support multiple active personalization station sessions. An additional advantage is that the programming logic required in the personalization station is reduced to that of managing data transfers.

Other mechanisms for control of the smart card personalization process will be apparent to those skilled in the art. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computerized system for controlling programming of portable programmed data carriers across a plurality of personalization stations, the system comprising:

a personalization server interface for acquiring services from one or more resources, transferring card information associated with a card object identifier to one of the personalization stations, and controlling the programming of the portable programmed data carriers in response to a request from one of the personalization stations;

a personalization station interface for receiving the card information associated with the card object identifier from the personalization server interface and for programming one of the portable programmed data carriers; and a controller interface for providing the card object identifier to the personalization station interface.

2. The computerized system of claim 1, wherein the services acquired by the personalization server interface are data services.

3. The computerized system of claim 1, wherein the services acquired by the personalization server interface are security services.

4. The computerized system of claim 1, wherein the services acquired by the personalization server interface are support services.

5. A computerized system for controlling programming of portable programmed data carriers across a plurality of personalization stations, the system comprising:

means for receiving, by a server, one or more card objects from a card issuer management system, wherein the card objects comprise information for programming the portable programmed data carriers;

means for receiving, by a personalization station, from a controller, a unique card object identifier;

means for requesting, by the personalization station, from the server, information for programming of the portable programmed data carriers based on the unique card object identifier;

means for receiving, by the server, from the personalization station, a programming request including the unique card object identifier for the portable programmed data carrier being personalized;

means for associating, by the server, the unique card object identifier in the programming request with the card object for the portable programmed data carrier being personalized; and means for utilizing, by the server, the card object to control the personalization station as the personalization station programs the portable programmed data carrier.

6. The computerized system of claim 5, further comprising means for acquiring security services from a security source.

7. The computerized system of claim 5, further comprising means for acquiring data from a data source.

8. The computerized system of claim 7, wherein the data source is the card issuer management system.

9. The computerized system of claim 5, further comprising means for providing support services.

10. A computer-readable medium having computer-executable instructions stored thereon for causing a computer to perform a method of controlling programming of portable programmed data carriers, the method comprising:

receiving, by a server, one or more card objects from a card issuer management system, wherein the card objects consist of information for programming the portable programmed data carriers;

receiving, by a personalization station, from a controller, a card object identifier;

requesting, by the personalization station, from the server, information for programming one of the portable programmed data carriers based on the card object identifier;

receiving, by the server, from one of the personalization stations, a programming request including the card object identifier for the portable data carrier being personalized;

associating, by the server, the card object identifier in the programming request with the card object for the portable programmed data carrier being personalized; and utilizing, by the server, the card object to control the personalization station as the personalization station programs the portable programmed data carrier.

11. The computer-readable medium of claim 10, having further computer-executable instructions for acquiring security services from a security source.

12. The computer-readable medium of claim 10, having further computer-executable instructions for acquiring data from a data source.

13. The computer-readable medium of claim 12, wherein the data source is the card issuer management system.

14. The computer-readable medium of claim 10, having further computer-executable instructions for providing support services.

15. A computer readable medium having stored thereon a data structure comprising:

a first data field containing data representing a card object containing data and commands for use by a personalization server to control the programming of a portable programmed data carrier by a personalization station; and a second data field containing data representing a unique card object identifier for use by the personalization server to identify the card object represented by the first data field in response to a programming request from the personalization station wherein personalization station receives the unique card object identifier from a controller.

16. A system for issuing portable programmed data carriers comprising:

a plurality of card objects identified by a like plurality of card object identifiers;

a plurality of personalization stations for receiving the card object identifiers and for programming the portable programmed data carriers using information contained in the card object identified by the card object identifier, wherein the plurality of personalization stations have at least two personalization station devices of differing type;

a plurality of controllers, each one of the plurality of controllers for providing one of the plurality of card object identifiers to one of the plurality of personalization stations; and a personalization server for controlling the programming of a portable programmed data carrier in response to a request from one of the personalization stations, wherein the personalization server translates the card object into commands and data and transfers the commands and data to the personalization stations making the request.

17. The system of claim 16, wherein the personalization server acquire services from one or more resources in response to a request from one of the personalization stations.

18. A method of programming a portable programmed data carrier in a system having a server, a personalization station and a controller, the method comprising:

receiving, by the personalization station, from a controller, a card object identifier;

requesting, by the personalization station, from the server, information for programming the portable programmed data carriers; and programming, by the personalization station, the portable programmed data carrier under the control of the server.

19. A method of controlling programming of portable programed data carriers in a system having a server, a plurality of personalization stations and a controller, the method comprising:

receiving, by the server, a card object from a card issuer management system, wherein the card object consists of information for programming the portable programmed data carriers;

receiving, by the personalization station, from a controller, a card object identifier;

requesting, by the personalization station, from the server, information for programming one of the portable programmed data carriers based on the card object identifier;

receiving, by the server, from one of the personalization stations, a programming request including the card object identifier for the portable programmed data carrier being personalized;

associating by the server, the card object identifier in the programming request with the card object for the portable programmed data carrier being personalized; and utilizing, by the server, the card object to control the personalization station as the personalization station programs the portable programmed data carrier.

20. The method of claim 19, further comprising acquiring data by the server from a data source.

21. The method of claim 20, wherein the data source is the card issuer management system.

22. The method of claim 19, further comprising acquiring security services by the server from a security source.

23. The method of claim 19, further comprising providing support services by the server.

* * * * *

UNITED STATES PATENT AND TRADEMARK OFFICE
CERTIFICATE OF CORRECTION

PATENT NO. : 6,196,459 B1
DATED : March 6, 2001
INVENTOR(S) : Robert Neal Goman, et al.

It is certified that error appears in the above-identified patent and that said Letters Patent is hereby corrected as shown below:

<u>Title page,</u>
Item [75], Inventor "Robert S. Ehrlich" should read -- Robin S. Ehrlich --.

Signed and Sealed this

Thirtieth Day of October, 2001

Attest:

*Nicholas P. Godici*

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO. : 6,196,459 B1
DATED : March 6, 2001
INVENTOR(S) : Goman et al.

It is certified that error appears in the above-identified patent and that said Letters Patent is hereby corrected as shown below:

Column 8, claim 1,
Line 49, insert -- requesting and -- receiving, therefore.

Column 10, claim 15,
Line 12, insert -- the -- personalization, therefore.

Signed and Sealed this

Twentieth Day of November, 2001

Attest:

*Attesting Officer*

NICHOLAS P. GODICI
*Acting Director of the United States Patent and Trademark Office*

US006196459C1

(12) EX PARTE REEXAMINATION CERTIFICATE (6945th)

United States Patent
Goman et al.

(10) Number: US 6,196,459 C1
(45) Certificate Issued: Jul. 21, 2009

(54) SMART CARD PERSONALIZATION IN A MULTISTATION ENVIRONMENT (75) Inventors: Robert Neal Goman, Minneapolis, MN (US); Denis C. Burand, Excelsior, MN (US); Thomas L. Younger, Wayzata, MN (US); Robin S. Ehrlich, Mendota Heights, MN (US)

(73) Assignee: Card Technology Corporation, Paramus, NJ (US)

Reexamination Request:
No. 90/008,517, Mar. 5, 2007

Reexamination Certificate for:
Patent No.: 6,196,459
Issued: Mar. 6, 2001
Appl. No.: 09/076,022
Filed: May 11, 1998

Certificate of Correction issued Oct. 30, 2001.

Certificate of Correction issued Nov. 20, 2001.

(51) Int. Cl.
    *G07F 7/10* (2006.01)

(52) U.S. Cl. .......................... 235/380; 235/492
(58) Field of Classification Search .................. None
    See application file for complete search history.

(56) References Cited

U.S. PATENT DOCUMENTS

| 4,772,782 | A | 9/1988 | Nonat |
| 4,825,054 | A | 4/1989 | Rust et al. |
| 4,827,425 | A | 5/1989 | Linden |
| 4,874,935 | A | 10/1989 | Younger |
| 5,025,399 | A | 6/1991 | Wendt et al. |
| 5,266,781 | A | 11/1993 | Warwick et al. |
| 5,534,857 | A | 7/1996 | Laing et al. |
| 5,557,679 | A | 9/1996 | Julin et al. |
| 5,640,193 | A | 6/1997 | Wellner |
| 5,684,742 | A | 11/1997 | Bublitz et al. |
| 5,712,979 | A | 1/1998 | Graber et al. |
| 5,799,316 | A | 8/1998 | Audren |
| 5,889,941 | A | 3/1999 | Tushie et al. |
| 6,196,459 | B1 | 3/2001 | Goman et al. |
| 2004/0256451 | A1 | 12/2004 | Goman et al. |

FOREIGN PATENT DOCUMENTS

| EP | 0706150 B1 | 4/1995 |
| EP | 706150 A1 | 4/1996 |

(Continued)

OTHER PUBLICATIONS

"Automating Solaris Installations: A Custom JumpStart Guide," P.A. Kasper, A.L. McClellan; SunMicrosystems, Inc.; SunSoft Press 1995; p. 7.

"Exploring JAVA"; P. Niemeyer & J. Peck; 1996 O'Reilly & Associates, Inc.; pp. 72–76.

"Security on the Move: Indirect Authentication Using Kerberos"; Armando Fox and Steven D. Gribble; Univeristy of California at Berkeley; {fox,gribble}@cs.berkeley.edu; at least by 1998.

"Pay–Per–View Starts Perking"; Richard Zoglin; Time Magazine; Mar. 6, 1989.

*Primary Examiner*—Albert J Gagliardi (57) ABSTRACT

A smart card personalization system provides an interface to smart card personalization stations and to external computing or data resources which normally are not available directly to personalization station. A card issuer management systems prepares card objects and assigns a unique card object identifier. A smart card personalization server receives the card objects from the card issuer management system. A smart card personalization controller receives the unique card object identifiers and routes the card object identifiers to waiting personalization stations. The personalization stations use the card object identifier to request data and services from the smart card personalization server in order to personalize the smart card. The services provided by the smart card personalization server include data services, security services and support services. The smart card personalization server supports multiple active personalization station sessions.

| | FOREIGN PATENT DOCUMENTS | |
|---|---|---|
| JP | 08-212310 | 8/1996 |
| WO | WO-95/22810 | 8/1995 |
| WO | WO-98/09257 | 8/1997 |
| WO | WO-97/39424 | 10/1997 |
| WO | WO-98/18106 | 4/1998 |
| WO | WO-9959109 A1 | 11/1999 |

US 6,196,459 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–15 and 18–23 is confirmed.

New claims 24–84 are added and determined to be patentable.

Claims 16 and 17 were not reexamined.

24. *The computerized system of claim 1, wherein the portable programmed data carriers comprise smart cards.*

25. *The computerized system of claim 1, wherein the services acquired by the personalization server interface comprise data and commands retrieved locally from the personalization server interface or from an external data source.*

26. *The computerized system of claim 25, wherein the external data source comprises a card issuer management system.*

27. *The computerized system of claim 1, wherein the services acquired by the personalization server comprise external computing resources.*

28. *The computerized system of claim 1, wherein the personalization server interface comprises a workstation.*

29. *The computerized system of claim 1, wherein the personalization server interface comprises a personal computer.*

30. *The computerized system of claim 1, wherein the personalization server interface comprises a computer system having one or more high speed processors.*

31. *The computerized system of claim 1, wherein the card object identifier is to identify a card object in a card object data store.*

32. *The computerized system of claim 31, wherein the card object data store comprises a database.*

33. *The computerized system of claim 31, wherein the card object data store comprises data for a job.*

34. *The computerized system of claim 33, wherein a job comprises a logical grouping of similar card objects.*

35. *The computerized system of claim 31, wherein a card object comprises data and commands for one of magnetic stripe encoding, embossing, printing, packaging, and smart card personalization.*

36. *The computerized system of claim 35, wherein printing comprises printing a photograph.*

37. *The computerized system of claim 35, wherein smart card personalization comprises a unique card object identifier.*

38. *The computerized system of claim 31, wherein a card object comprises data that is unique to the portable programmed data carriers to be programmed by the personalization station interface.*

39. *The computerized system of claim 1, wherein each personalization station comprises programming logic to manage data transfers.*

40. *The computerized system of claim 5, wherein the personalization station comprises one of a card printer, embossing device, an integrated smart card interface device, and an add-on smart card interface device.*

41. *The computerized system of claim 5, wherein the personalization station comprises one of an automatic teller machine, a point of sale terminal, an unattended kiosk, a personal computer, a network computer, and an on-line telecommunication device.*

42. *The computerized system of claim 5, wherein the server is to translate the card object.*

43. *The computerized system of claim 5, wherein the server is to provide an interface to external security services to perform a personalization job on one or more portable programmed data carriers.*

44. *The computerized system of claim 5, wherein the server is to provide an interface to additional data sources to perform a personalization job on one or more portable programmed data carriers.*

45. *The computerized system of claim 44, wherein the server is coupled to the additional data sources through data query commands of a software program.*

46. *The computerized system of claim 5, wherein the server comprises software to serve multiple card personalization processes.*

47. *The computerized system of claim 46, wherein each card personalization process represents a personalization job occurring at one of the personalization stations.*

48. *The computerized system of claim 46, wherein each card personalization process is logically linked to one of the personalization stations.*

49. *The computerized system of claim 46, wherein the card personalization processes utilize virtual memory and share resources through threading.*

50. *The computerized system of claim 5, wherein the server supports multiple active personalization station sessions.*

51. *The computer-readable medium of claim 10, wherein the card objects received from the card issuer management system comprise information on the type of portable programmed data carrier.*

52. *The computer-readable medium of claim 10, wherein the card objects received from the card issuer management system comprise information on card applications to embed in the portable programmed data carrier.*

53. *The computer-readable medium of claim 10, wherein the card objects received from the card issuer management system comprise information on personalization equipment.*

54. *The computer-readable medium of claim 10, wherein the card objects received from the card issuer management system comprise information about each individual cardholder comprising selected ones of name, account number, card expiration date, and applicable services.*

55. *The computer-readable medium of claim 10, having further computer-executable instructions for the card object identifier in the programming request to initiate access to one of data services, security services, and support services to complete personalization of the portable programmed data carrier.*

56. *The computer-readable medium of claim 10, having further computer-executable instructions for the server to translate the card object associated with the card object identifier.*

57. *The computer-readable medium of claim 56, having further computer-executable instructions for the personalization station to pass translated commands and data to the portable programmed data carrier.*

58. The computer-readable medium of claim 57, having further computer-executable instructions for the personalization station to return data and/or status signals to the server as an acknowledgement.

59. The computer-readable medium of claim 58, wherein the data comprises a serial number unique to the portable programmed data carrier.

60. The computer-readable medium of claim 58, wherein the data comprises a random number.

61. The computer-readable medium of claim 60, having further computer-executable instructions for the data to be used by an authentication algorithm.

62. The computer-readable medium of claim 57, wherein the commands and data comprise a write command and associated data.

63. The computer-readable medium of claim 57, and having further computer-executable instructions for software in the personalization station to service commands from the server.

64. The computer-readable medium of claim 15, wherein the commands comprise a select command.

65. The computer-readable medium of claim 15, wherein the commands comprise a format complete command.

66. The method of claim 18, wherein the server comprises software to obtain job information and data elements to program the portable programmed data carrier.

67. The method of claim 18, wherein the server comprises software to provide data services, security services, and support services.

68. The method of claim 19, wherein the server provides an interface to each of the plurality of personalization stations.

69. The method of claim 19, further comprising:
an application executing on the card issuer management system to prepare the card object.

70. The method of claim 19, further comprising:
an application executing on the card issuer management system to assign a card object identifier to the card object.

71. The method of claim 19, further comprising:
archiving information regarding the card object in a card object database.

72. The method of claim 19, further comprising:
the server notifying the personalization station at completion of the programming request.

73. The method of claim 20, wherein the data comprises one of a file, a database, and a data structure.

74. The method of claim 20, wherein the data source comprises a card object database on the card issuer managment system.

75. The method of claim 20, wherein the data source comprises one of a plurality of external data sources.

76. The method of claim 22, wherein the security services interface with a variety of different external sources that provide security functions.

77. The method of claim 22, wherein the security functions include elements to secure information or limit access to smart card chips until a required security condition is met.

78. The method of claim 77, wherein a selected security function utilizes one or more secure keys that are programmed into a selected smart card chip to prevent fraudulent use of the portable programmed data carrier.

79. The method of claim 78, wherein secure key data is obtained by software in the server from secure key records maintained by a card issuer or an external security source.

80. The method of claim 79, wherein the secure key data is transferred to interface software in the personalization station.

81. The method of claim 22, wherein the security services provide security functions to ensure the integrity and secrecy of data during the transmission of the data to and from the personalization station.

82. The method of claim 23, wherein the support services comprise functions that can be shared between processes.

83. The method of claim 23, wherein the support services comprise data conversions and validations.

84. The method of claim 23, wherein the support services comprise formatting a ten digit string of numbers representing a telephone number so that an area code is in parentheses.

* * * * *

(12) EX PARTE REEXAMINATION CERTIFICATE (7764th)
United States Patent
Goman et al.

(10) Number: US 6,196,459 C2
(45) Certificate Issued: Sep. 21, 2010

(54) SMART CARD PERSONALIZATION IN A MULTISTATION ENVIRONMENT

(75) Inventors: Robert Neal Goman, Minneapolis, MN (US); Denis C. Burand, Excelsior, MN (US); Thomas L. Younger, Wayzata, MN (US); Robin S. Ehrlich, Mendota Heights, MN (US)

(73) Assignee: Card Technology Corporation, Paramus, NJ (US)

Reexamination Request:
No. 90/010,717, Nov. 19, 2009

Reexamination Certificate for:
Patent No.: 6,196,459
Issued: Mar. 6, 2001
Appl. No.: 09/076,022
Filed: May 11, 1998

Reexamination Certificate C1 6,196,459 issued Jul. 21, 2009

Certificate of Correction issued Oct. 30, 2001.

Certificate of Correction issued Nov. 20, 2001.

(51) Int. Cl.
*G07F 7/10* (2006.01)

(52) U.S. Cl. .......................................... 235/380; 235/492
(58) Field of Classification Search ........................ None
See application file for complete search history.

(56) References Cited

U.S. PATENT DOCUMENTS

| | | | |
|---|---|---|---|
| 5,557,679 A | 9/1996 | Julin et al. | |
| 5,799,316 A | 8/1998 | Audren | |
| 5,889,941 A | 3/1999 | Tushie et al. | |
| 6,279,047 B1 | 8/2001 | Bublitz et al. | |

OTHER PUBLICATIONS

Andre Eickler et al.; A Performance Evaluation of OID Mapping Techniques; University of Maryland, Department of Computer Science, College Park MD 20742; 1995; 12 pgs.

Biget et al.; Future Generation Computer Systems; vol. 13, 1997; Elsevier Science B.V.; North Holland; 96 pgs.

Jim Farley; Java Distributed Computing; 1998 O'Reilly & Associates, Inc. 101 Morris Street, Sebastopol CA 95472; 368 pgs.

*Primary Examiner*—James Menefee (57) ABSTRACT

A smart card personalization system provides an interface to smart card personalization stations and to external computing or data resources which normally are not available directly to personalization station. A card issuer management systems prepares card objects and assigns a unique card object identifier. A smart card personalization server receives the card objects from the card issuer management system. A smart card personalization controller receives the unique card object identifiers and routes the card object identifiers to waiting personalization stations. The personalization stations use the card object identifier to request data and services from the smart card personalization server in order to personalize the smart card. The services provided by the smart card personalization server include data services, security services and support services. The smart card personalization server supports multiple active personalization station sessions.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-84 is confirmed.

* * * * *